No. 611,605.   Patented Oct. 4, 1898.
A. G. & E. W. CANNON.
FLEXIBLE SHAFT DEVICE.
(Application filed May 14, 1897.)
(No Model.)
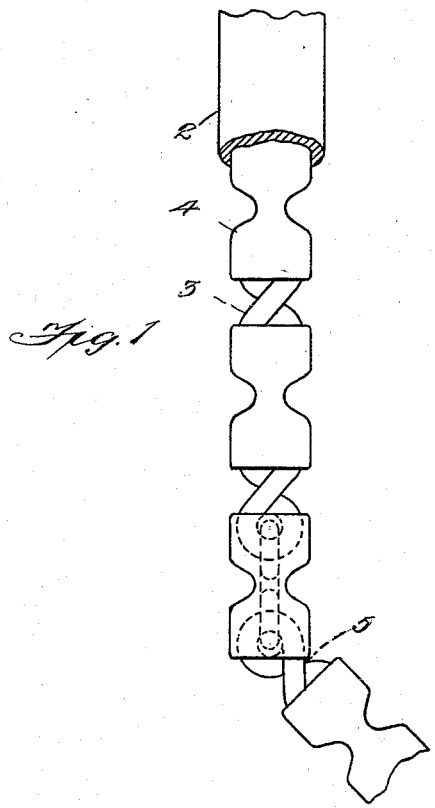
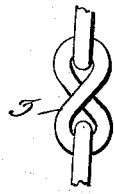
WITNESSES_
A. M. Tuttle
G. E. Thompson.
INVENTORS_
A. G. Cannon
E. W. Cannon
By C. B. Tuttle
Atty

UNITED STATES PATENT OFFICE.

ALEXANDER G. CANNON AND EDWARD W. CANNON, OF BOSTON, MASSACHUSETTS, ASSIGNORS, BY MESNE ASSIGNMENTS, TO CALVIN B. TUTTLE, TRUSTEE, OF LYNN, MASSACHUSETTS.

FLEXIBLE-SHAFT DEVICE.

SPECIFICATION forming part of Letters Patent No. 611,605, dated October 4, 1898.

Application filed May 14, 1897. Serial No. 636,480. (No model.)

*To all whom it may concern:*

Be it known that we, ALEXANDER G. CANNON and EDWARD W. CANNON, of Boston, in the county of Suffolk and Commonwealth of Massachusetts, have invented certain Improvements in Flexible-Shaft Devices, of which the following, taken in connection with the accompanying drawings, is a specification.

This invention relates to a flexible-shaft device, and has for its object to provide against the cramping or kinking of the shaft link members and thereby to avoid the objectionable results hereinafter set forth.

In the accompanying drawings, Figure 1 shows in elevation a section of flexible shaft embodying this invention. Fig. 2 is a detail.

The shaft device as a whole includes an outer casing 2, and has a series of interlooped members inclosed with said casing, wherethrough the power is transmitted throughout the shaft device, the interlooped members respectively permitting swinging movement laterally and thereby giving flexibility and permitting free bending and turning of the shaft device as a whole. As heretofore constructed, the interlooped members consist of a plurality of link members formed and interlooped in well-known chain construction. It will be understood that resistance at the discharge end of the shaft operates backwardly, causing the link members to bind against each other, and if under these conditions the link member becomes turned or bent laterally to a sufficient extent the said resistive force will operate such link against the member interlocked therewith and turning it part way round and backwardly over the end of said members, holding there by cramp force in a kinked condition. Obviously the operation of different link members in the kinking and unkinking operations gives an irregularity and uneven character to the discharged force, and it is to obviate this that the present invention is devised. In this connection it is observed that the link member must be turned with its axis at an angle of more than forty-five, and generally quite to an angle of sixty, degrees to the axis of the adjacent link member before it can pass over the end thereof to become cramped and kinked backwardly on such member, and in carrying out this invention stop devices are contrived for preventing displacement or turning of a link member beyond the said angle of forty-five to sixty degrees, approximately. Said stop contrivances are shown as jacket or sleeve formations 4, made of tubular metal and shrunk or pinched onto the link members 3, whereby they are respectively supported. The sleeve is made to inclose the joint of union of the supporting link members with an adjacent member and is projected beyond the joint for engagement with the body of the said adjacent member whenever the same is turned to the said angle of forty-five to sixty degrees laterally, and thereby all further lateral movement is stopped, as indicated at 5. In the present instance the jackets 4 are projected from the supporting link members in both directions, and are therefore mounted upon the alternate link members throughout the shaft; but instead of this the jacket could be projected from one end only and a jacket mounted in every link. It will be noted that these jackets are separate one from another— that is, they do not form a continuous casing of the nature of the casing 2.

Having thus described our invention, what we claim as new, and desire to secure by Letters Patent, is—

1. In a device of the character indicated, two connected links, and a non-continuous jacket upon one link and projecting from the end thereof over the second link, whereby kinking of said links is prevented; substantially as described.

2. In a device of the character indicated, three connected links, and a jacket about the central link projecting over the end of said link and over the end of an adjacent link, said jacket having a contracted portion about the central link of less width than the ends of the links connected to said central link; substantially as described.

3. In a device of the character indicated, three connected links, and a jacket about the central link projecting over the ends of said link and the ends of the adjacent links, the said jacket having a depressed portion between the ends of the side links of less width than said ends; substantially as described.

Signed at Lynn this 7th day of May, A. D. 1897.

ALEXANDER G. CANNON.
EDWARD W. CANNON.

Witnesses:
C. B. TUTTLE,
A. M. TUTTLE.